(12) United States Patent
Arulandu et al.

(10) Patent No.: US 10,734,921 B2
(45) Date of Patent: Aug. 4, 2020

(54) ENERGY GENERATION SYSTEM AND METHOD

(71) Applicant: KONINKLIJKE PHILIPS N.V., Eindhoven (NL)

(72) Inventors: Kumar Arulandu, Eindhoven (NL); Neil Francis Joye, Eindhoven (NL); Alan James Davie, Eindhoven (NL); Peter Van Delft, Eindhoven (NL); Mark Thomas Johnson, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 15/776,124

(22) PCT Filed: Dec. 1, 2016

(86) PCT No.: PCT/EP2016/079470
§ 371 (c)(1),
(2) Date: May 15, 2018

(87) PCT Pub. No.: WO2017/093424
PCT Pub. Date: Jun. 8, 2017

(65) Prior Publication Data
US 2018/0375443 A1    Dec. 27, 2018

(30) Foreign Application Priority Data

Dec. 3, 2015    (EP) .................................... 15197768

(51) Int. Cl.
*H02N 1/04*    (2006.01)
*H02N 2/18*    (2006.01)
(Continued)

(52) U.S. Cl.
CPC ................. *H02N 1/04* (2013.01); *H02M 3/07* (2013.01); *H02N 2/181* (2013.01); *H02N 11/002* (2013.01)

(58) Field of Classification Search
CPC .. H02N 1/04; H02N 2/04; H02N 2/06; H02N 2/14; H02N 2/181; H02N 2/0075; H02M 3/156; H02M 3/07; H02M 7/06
See application file for complete search history.

(56) References Cited

U.S. PATENT DOCUMENTS

| 4,678,905 A * | 7/1987 | Phillips | ................. G01D 5/268 250/227.21 |
| 5,574,287 A * | 11/1996 | Kuzdrall | ................... G01J 1/44 250/205 |

(Continued)

FOREIGN PATENT DOCUMENTS

| CN | 103780137 | 5/2014 |
| CN | 104811085 | 7/2015 |

(Continued)

OTHER PUBLICATIONS

Z.Wang "Triboelectric Nanogenerators as New Energy Technology for Self-Powered Systems and as Active Mechanical and Chemical Sensors" ACS Nano vol. 7, No. 11 9533-9557, Sep. 2013. (Year: 2013).*

(Continued)

*Primary Examiner* — Burton S Mullins (57) ABSTRACT

A system comprises a power generator for generating electrical power and a switched capacitor converter for down-converting the output voltage of the power generator. The switched capacitor converter comprises a bank of capacitors and a switch arrangement. A controller is used for controlling the switches, based on a feedback signal from the power generator. This provides automatic control of the switched (Continued)

capacitor converter, thereby simplifying the overall control circuitry and improving efficiency.

15 Claims, 4 Drawing Sheets

(51) Int. Cl.
*H02M 3/07* (2006.01)
*H02N 11/00* (2006.01)

(56) References Cited

U.S. PATENT DOCUMENTS

| | | | | |
|---|---|---|---|---|
| 5,763,783 | A * | 6/1998 | Asada | G01P 15/18 73/514.31 |
| 6,407,483 | B1 * | 6/2002 | Nunuparov | G21H 1/00 310/339 |
| 6,628,040 | B2 * | 9/2003 | Pelrine | F02G 1/043 310/307 |
| 6,756,930 | B1 * | 6/2004 | Nunuparov | H02M 3/07 323/304 |
| 7,088,031 | B2 * | 8/2006 | Brantner | H02N 2/181 310/319 |
| 8,076,825 | B1 * | 12/2011 | Kaajakari | H02N 2/181 290/1 R |
| 8,773,004 | B2 * | 7/2014 | Despesse | H02N 2/181 310/339 |
| 8,854,847 | B2 * | 10/2014 | Farnsworth | H02N 2/181 307/110 |
| 9,178,446 | B2 * | 11/2015 | Wang | H02N 1/04 |
| 9,461,504 | B2 * | 10/2016 | Ramorini | H02M 3/1588 |
| 9,484,842 | B2 * | 11/2016 | Wang | H02N 1/04 |
| 2004/0166814 | A1 | 8/2004 | Balmain et al. | |
| 2013/0265023 | A1 | 10/2013 | Schwartz | |
| 2014/0246951 | A1 | 9/2014 | Wang et al. | |
| 2015/0035408 | A1 * | 2/2015 | Despesse | H02N 1/08 310/310 |
| 2015/0077085 | A1 * | 3/2015 | Chen | H02M 3/158 323/299 |
| 2016/0149518 | A1 * | 5/2016 | Wang | H02N 1/04 310/310 |
| 2016/0218640 | A1 * | 7/2016 | Wang | H02N 1/04 |

FOREIGN PATENT DOCUMENTS

| | | |
|---|---|---|
| EP | 2469693 A1 | 6/2012 |
| FR | 2854006 | 10/2004 |

OTHER PUBLICATIONS

Wang et al "Tribolectric Nanogenerators as Self Powered Active Sensors" Nano Energy 11 (2015) p. 436-462.
Diaz et al "A Semi-Quantitative Tribo-Electric Series for Polyeric Materials . . . " Journal of Electrostatics 62 (2004) p. 277-290.
Wang "Triboelectric Nanogenerators as New Energy Technology for Self-Powered Systems and as Active Mechanical and Chemical Sensors" ACS Nano 7.11 (2013) p. 9533-9557.
Bai et al "Integrated Multilayered Triboelectric Nanogenerator for Harvesting Biomechanical Energy From Human Motions" ACS Nano 2013 7(4) p. 3713-3719.
Wang et al "Freestanding Triboelectric-Layer Based Nano-Generators for Havesting Energy From a Moving Object of Human Motion in Contact and Non-Contact Modes" Adv. Mater. 2014 26 p. 2818-2824.
Ya et al "Single Electrode Based Sliding Triboelectric Nanogenerator for Self-Powered Displacment Vector Sensor System" ACS Nano 7.8 (2013) p. 7342-7351.
Lin et al "Segmentally Structured Disc Triboelectric Nanogenerator for Harvesting Rotational Mechanical Energy" Nano Lett. 2013 13(6) pp. 2916-2923.
Lin "Noncontact Free-Rotating Disc Triboelectric Nanogenerator as a Sustainable Energy Harvester and Self-Powered Mechanical Sensor" ACS Appl. Mater. Interfaces, 2014 6(4) pp. 3031-3038.
Tang et al "A Power Transformed and Managed Triboelectric Nanogenerator and Its Applications in a Self Powered Wireless Sensing Node" Nanotechnology 25 (2014).

* cited by examiner

ENERGY GENERATION SYSTEM AND METHOD

CROSS-REFERENCE TO PRIOR APPLICATIONS

This application is the U.S. National Phase application under 35 U.S.C. § 371 of International Application No. PCT/EP2016/079470, filed on Dec. 1, 2016, which claims the benefit of EP Patent Application No. EP 15197768.3, filed on Dec. 3, 2015. These applications are hereby incorporated by reference herein.

FIELD OF THE INVENTION

This invention relates to an electrical energy generator for converting mechanical energy into electrical energy and methods of energy generation.

BACKGROUND OF THE INVENTION

One example of such a system, whereby mechanical energy may be converted into electrical energy, is a triboelectric energy generation system. The triboelectric effect (also known as triboelectric charging) is a contact-induced electrification in which a material becomes electrically charged after it is contacted with a different material through friction. Triboelectric generation is based on converting mechanical energy into electrical energy through methods which couple the triboelectric effect with electrostatic induction. It has been proposed to make use of triboelectric generation to power mobile wearable devices such as sensors and smartphones by capturing the otherwise wasted mechanical energy from such sources as walking, random body motions, the wind blowing, vibration or ocean waves. See, for example: Wang, Sihong, Long Lin, and Zhong Lin Wang, Triboelectric nanogenerators as self-powered active sensors, *Nano Energy* 11 (2015): 436-462).

The triboelectric effect is based on a series that ranks various materials according to their tendency to gain electrons (become negatively charged) or lose electrons (become positively charged). This series is for example disclosed in A. F. Diaz and R. M. Felix-Navarro, A semi-quantitative tribo-electric series for polymeric materials: the influence of chemical structure and properties, Journal of Electrostatics 62 (2004) 277-290. The best combinations of materials to create static electricity are one from the positive charge list and one from the negative charge list (e.g. PTFE against copper, or FEP against aluminium). Rubbing glass with fur, or a comb through the hair are well-known examples from everyday life of triboelectricity.

In its simplest form, a triboelectric generator thus uses two sheets of dissimilar materials, one an electron donor, the other an electron acceptor. One or more of the materials can be an insulator. Other possible materials might include semiconductor materials, for example silicon comprising a native oxide layer. When the materials are brought into contact, electrons are exchanged from one material to the other. This is simply the triboelectric effect. If the sheets are then separated, each sheet holds an electrical charge (of differing polarity), isolated by the gap between them, and an electric potential is built up. If an electrical load is connected between electrodes deposited/placed at the backside of the two material surfaces, any further displacement of the sheets, either laterally or perpendicularly, will induce in response a current flow between the two electrodes. This is simply an example of electrostatic induction. As the distance between the respective charge centers of the two plates is increased, so the attractive electric field between the two, across the gap, weakens, resulting in an increased potential difference between the two outer electrodes, as electrical attraction of charge via the load begins to overcome the electrostatic attractive force across the gap.

In this way, triboelectric generators convert mechanical energy into electrical energy through a coupling between two main physical mechanisms: contact electrification (tribo-charging) and electrostatic induction.

By cyclically increasing and decreasing the mutual separation between the charge centers of the plates, so current can be induced to flow back and forth between the plates in response, thereby generating an alternating current across the load. Triboelectric generator devices thus can be considered as charge pumps.

The power output can be increased by applying micron-scale patterns to the polymer sheets. The patterning effectively increases the contact area and thereby increases the effectiveness of the charge transfer.

Recently, an emerging material technology for power generation (energy harvesting) and power conversion has been developed which makes use of this effect, as disclosed in Wang, Z. L., "Triboelectric nanogenerators as new energy technology for self-powered systems and as active mechanical and chemical sensors." *ACS nano* 7.11 (2013): 9533-9557. Based on this effect several device configurations have been developed of so-called triboelectric generators ("TEG").

Since their first reporting in 2012, the output power density of TEGs has been greatly improved. The volume power density may reach more than 400 kilowatts per cubic meter, and an efficiency of ~60% has been demonstrated (ibid.). In addition to high output performance, TEG technology carries numerous other advantages, such as low production cost, high reliability and robustness, and low environmental impact.

The TEG may be used as an electrical power generator, i.e. energy harvesting from, for example, vibration, wind, water or random body motions or even conversion of mechanically available power into electricity. The generated voltage is a power signal.

TEGs may broadly be divided into four main operational classes.

A first mode of operation is a vertical contact-separation mode, in which two or more plates are cyclically brought into or out of contact by an applied force. This may be used in shoes, for example, where the pressure exerted by a user as they step is utilized to bring the plates into contact. One example of such a device has been described in the article "Integrated Multilayered Triboelectric Nanogenerator for Harvesting Biomechanical Energy from Human Motions" of Peng Bai et. al. in ACS Nano 2013 7(4), pp. 3713-3719. Here, the device comprises a multiple layer structure formed on a zigzag shaped substrate. The device operates based on surface charge transfer due to contact electrification. When a pressure is applied to the structure, the zigzag shape is compressed to create contact between the different layers, and the contact is released when the pressure is released. The energy harvested might for example be used for charging of mobile portable devices.

A second mode of operation is a linear sliding mode, wherein plates are induced to slide laterally with respect to one another in order to change the area of overlap between them. A potential difference is induced across the plates, having an instantaneous magnitude in proportion to the rate of change of the total overlapping area. By repeatedly bringing plates into and out of mutual overlap with one another, an alternating current may be established across a load connected between the plates.

A design which enables energy to be harvested from sliding motions is disclosed in the article "Freestanding Triboelectric-Layer-Based Nanogenerators for Harvesting Energy from a Moving Object of Human Motion in Contact and Non-Contact Modes" in Adv. Mater. 2014, 26, 2818-2824. A freestanding movable layer slides between a pair of static electrodes. The movable layer may be arranged not to make contact with the static electrodes (i.e. at small spacing above the static electrodes) or it may make sliding contact.

A third mode of operation is a single electrode mode in which one surface is for example grounded—for example, a floor road—and a load is connected between this first surface and ground (see for example Yang, Ya, et al. "Single-electrode-based sliding triboelectric nanogenerator for self-powered displacement vector sensor system," *ACS nano* 7.8 (2013): 7342-7351.). The second surface—not electrically connected to the first—is brought into contact with the first surface and tribocharges it. As the second surface is then moved away from the first, the excess charge in the first surface is driven to ground, providing a current across the load. Hence only a single electrode (on a single layer) is used in this mode of operation to provide an output current.

A fourth mode of operation is a freestanding tribo electric layer mode, which is designed for harvesting energy from an arbitrary moving object to which no electrical connections are made. This object may be a passing car, passing train, or a shoe, for example (Again, see "Triboelectric nanogenerators as new energy technology for self-powered systems and as active mechanical and chemical sensors", *ACS nano* 7.11 (2013): 9533-9557).

One particular subset of linear sliding mode TEGs which have been developed are rotational disc TEGs which can be operated in both a contact (i.e. continuous tribocharging and electrostatic induction) or a non-contact mode (i.e. only electrostatic induction after initial contact electrification). Rotational disc TEGs typically consist of at least one rotor and one stator each formed as a set of spaced circle sectors (segments). The sectors overlap and then separate as the two discs rotate relative to each other. As described above, a current may be induced between two laterally sliding—oppositely charged—layers, with a magnitude in proportion to the rate of change of the area of overlap. As each consecutively spaced sector of the rotor comes into and then out of overlap with a given stator sector, so a current is induced between the two sector plates, initially in a first direction, as the plates increase in overlap, and then in the opposite direction as the plates decrease in overlap.

The limitations of early versions of segmentally structured disc TEGs (Long Lin et al., Segmentally Structured disc Triboelectric Nanogenerator for Harvesting Rotational Mechanical Energy, Nano Lett., 2013, 13 (6), pp. 2916-2923) were that the rotational and stationary triboelectric layers require deposition of metal electrodes and connection with electrical leads, leading to inconvenient operation of the rotational part. Furthermore intimate contact is mandatory to achieve efficient electricity generation, which results in possible material wear, wear particles, instability of output, and generally limited lifetime of the TEG.

A disc TEG with both groups of patterned electrodes attached onto a stationary disc, together with a freestanding triboelectric layer on a rotational disc can resolve these issues, as disclosed in Long Lin et al., Noncontact Free-Rotating disc Triboelectric Nanogenerator as a Sustainable Energy Harvester and Self-Powered Mechanical Sensor. ACS Appl. Mater. Interfaces, 2014, 6 (4), pp. 3031-3038.

With such a structure, there is no necessity for electrode deposition or electrical connection for the rotational part, which dramatically improves the operating facility of the energy harvester.

Although the TEG shows promise, it has challenges when the output power of the TEG needs to be converted to voltage and current levels for practical applications that include electronics such as micro controllers. At such low power levels produced by TEG, it is key to have an efficient power conversion stage.

A power conversion stage is required to convert the TEG voltage in the range of a few hundreds of volts to a low voltage such as below 10V. Converting such low power levels by means of a switched-mode power supply (SMPS) is not really practical as a high inductance value is required. Moreover, the supply current required for the controller is usually in the same range as is generated by the TEG. In this case, an external power supply would typically be needed in order to power the SMPS converter. This situation is, as expected, not desirable since the power consumption of the converter would be of the same order of magnitude as the power generated by the TEG, which would lead to a low power conversion efficiency of the system.

Another disadvantage of using SMPS converters in TEG applications is the difficulty in generating the driving signals of these converters. The driving signals of a SMPS converter should for example be synchronized to the generated output signal of its TEG. Since TEGs can generate fast varying signals over time, this synchronization is not straightforward.

Switched capacitor converters can for example be implemented as power converters. Although such converters do not require any inductance, their driving signals still need to be correctly synchronized with the signal generated by the TEGs. Such synchronization—which is also of importance for other aspects such as feedback for controlling of power output or for sensing functionality—is not straightforward.

SUMMARY OF THE INVENTION

The invention is defined by the claims.

Examples in accordance with an aspect of the invention provide:

a power generator for generating electrical power in response to mechanical actuation;

a switched capacitor power converter for power converting the output of the power generator, wherein the switched capacitor converter comprises a bank of capacitors and a switch arrangement; and a controller for controlling the switch arrangement, wherein the controller is adapted to control the switches based on a feedback signal from the power generator.

In this way, the power generator creates a feedback signal which is then used to control a switched capacitor converter for converting the input voltage, for example for down-converting the input voltage, without significant power losses. Note however that such self-synchronization will be advantageous for other systems where e.g. feedback, sensing, communication needs to be carried out more efficiently. There may be a set of feedback signals.

The feedback signal is preferably generated in directly in response to motion. This means the feedback signal is not generated based on signal processing of the output voltage or power, and therefore does not require significant power consumption to generate the feedback signal.

The power generator may comprise a triboelectric power generator (TEG). By way of example, the extra patterns of the TEG moving parts (stator and/or rotor) may be used for generation of the feedback control signal for the switched capacitor converter. There is thus no need for detecting and synchronizing with the generated power supply or generated voltage.

The power generator may comprise a charge coupled device such as a photodiode for generating the feedback signal. The generation of charge by the power generation is thus used to create the feedback signal directly.

The power generator may comprise a signal generator for generating the feedback signal in response to a mechanical motion of a part of the power generator. Motion of parts of the generator are thus used to create the feedback signal directly. In this case, the power generator may for example comprise a mechanical charge coupled device such as a piezoelectric or pyro electric device.

The power generator may comprise a signal generator for generating the feedback signal in response to magnetic coupling detected by a sensor.

In one set of examples, the power generator comprises a rotating disc triboelectric power generator, comprising a rotor and a stator, wherein a rotor and/or stator pattern is provided for generating the feedback signal.

This requires no additional hardware or circuitry to generate the required feedback signal.

The rotor or stator may for example comprise a ring of generation electrodes each comprising a radial segment, with the different segments isolated from each other, and a set of charge generating control electrodes for generating the feedback signal.

In one example, the charge generating control electrodes are positioned around the periphery of the generation electrodes.

In another example, the charge generating control electrodes are positioned between adjacent radial segments.

Examples in accordance with another aspect of the invention provide an energy generation or conversion method comprising:

generating electrical power using a power generator in response to mechanical actuation;

implementing power conversion of the output of the power generator, using a switched capacitor power converter which comprises a bank of capacitors and a switch arrangement; and controlling the switch arrangement based on a feedback signal from the power generator.

The feedback signal may for example be generated directly in response to motion. This avoids the need for complex circuitry to control the switched capacitor power converter.

The feedback signal may be generated using:
a charge coupled device such as a photodiode; or
a signal generator which generates a signal in response to a mechanical motion of a part of the power generator;
a sensor for sensing a magnetic coupling; or
a rotor and/or stator pattern of a rotating disc triboelectric power generator.

The feedback signal may be generated using a rotor and/or stator pattern of a rotating disc triboelectric power generator in which the rotor or stator comprises a ring of generation electrodes each comprising a radial segment, with the different segments isolated from each other, and a set of charge generating control electrodes for generating the feedback signal.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a system comprising a power generator for generating electrical power and a switched capacitor converter for down-converting the output voltage of the power generator. The switched capacitor converter comprises a bank of capacitors and a switch arrangement. A controller is used for controlling the switches, based on a feedback signal from the power generator. This provides automatic control of the switched capacitor converter, thereby simplifying the overall control circuitry and improving efficiency.

As mentioned above, a switched capacitor power converter is of interest for power harvesting applications. Series to parallel conversion using a switched bank of capacitors provides one way to efficiently reduce a high output voltage, for example from the output of an energy harvesting application such as a triboelectric generator.

Figure 1:
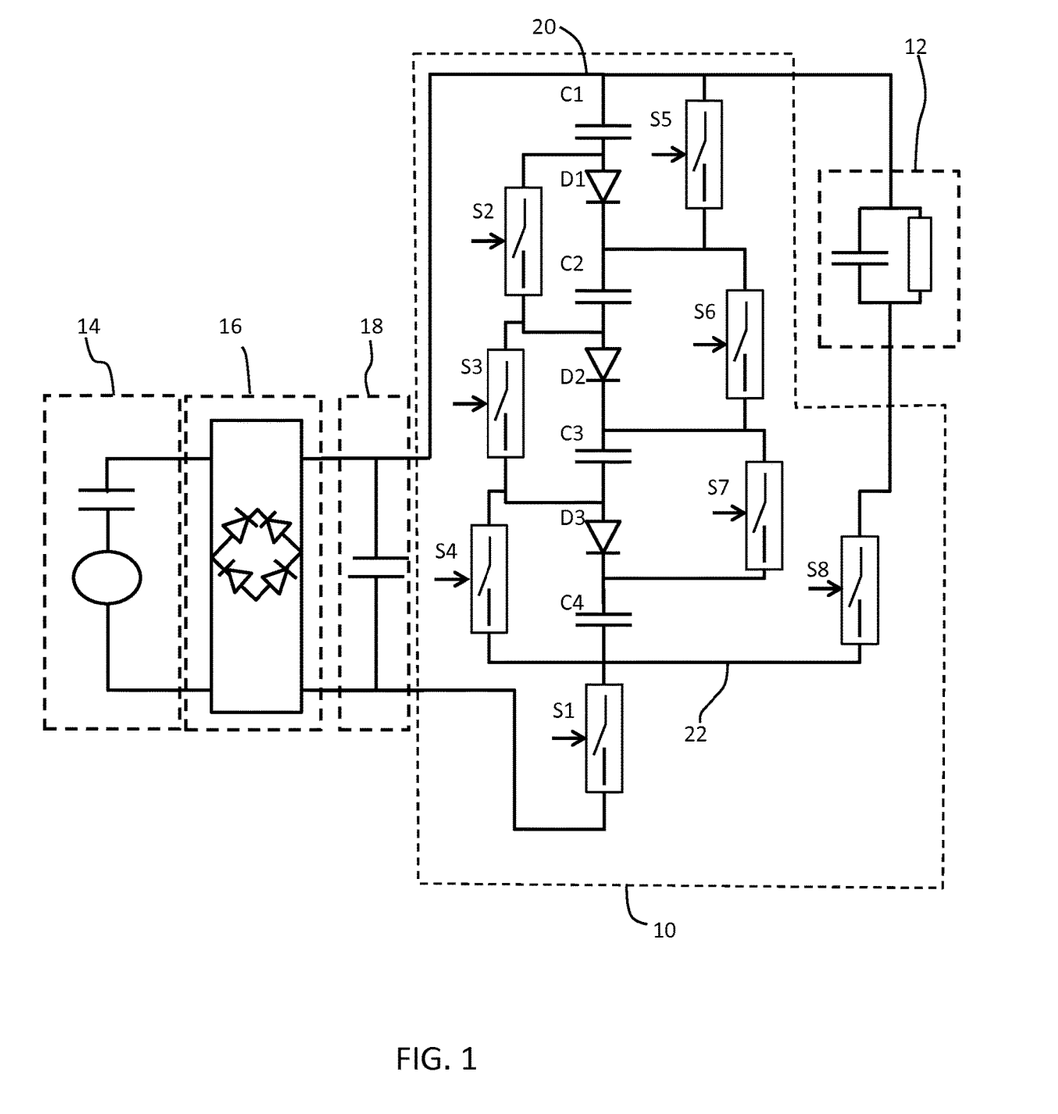
FIG. 1 shows a system including a triboelectric power generator and a switched capacitor power converter.

FIG. 1 shows a switched capacitor converter circuit 10 for supplying power to a load 12. A triboelectric generator 14 provides the input power, which is rectified by a full bridge rectifier 16 and smoothed by a buffer capacitor 18 before being provided as input to the switched converter capacitor circuit 10.

The triboelectric generator 14 is of known design, and for example generates an alternating voltage waveform with a magnitude that depends on the strength of movement. A triboelectric generator is characterized in that the relative charge between first and second sets of generating elements is established and maintained by means of intermittent periods of physical contact, during which reciprocal charge is built up on the elements of each set (a process of tribo-charging). The generating elements are composed of materials which are triboelectrically active (which form part of the 'triboelectric series').

The stator may comprise a series of disposed (conductive) electrodes, while the rotor comprises a freestanding layer of dielectric material, which may be metallic or non-metallic. In addition (as discussed in Long Lin et al., Noncontact Free-Rotating disc Triboelectric Nanogenerator as a Sustainable Energy Harvester and Self-Powered Mechanical Sensor. ACS Appl. Mater. Interfaces, 2014, 6 (4), pp. 3031-3038), with such a structure, there is no necessity for electrode deposition or electrical connection for the rotational part, which dramatically improves the operating facility of the generator. Of course, the designs of the rotor and stator may be reversed.

Alternatively, both the rotor and stator may have electrode arrangements.

FIG. 1 shows a full bridge rectifier, but in other examples, a half bridge rectifier may be used, or alternatively the generator 1 may deliver a DC output. Various designs of triboelectric generator are discussed above.

The switched capacitor circuit 10 comprises a series connection of four capacitors C1 to C4 with a diode D1, D2, D3 between each adjacent pair. The series chain extends between a high signal line 20 and a low signal line 22. The high signal line 20 connects to the high terminal of the buffer capacitor 18 and the high terminal of the load 12. The low signal line 22 is connected to the low terminal of the buffer capacitor through a first switch S1.

A first set of switches S2, S3, S4 is provided, with each switch across a diode and the following capacitor in the series chain. A second set of switches S5, S6, S7 is provided, with each switch across a capacitor and the following diode. Thus, the switches of the first and second sets are staggered. The first set of switches S2, S3, S4 enables all of the lower capacitor terminals to be connected together, and the second set of switches S5, S6, S7 enables all of the higher capacitor terminals to be connected together.

An output switch S8 is between the low signal line 22 and a low terminal of the load 12.

When the maximum voltage is reached across the buffer capacitor 18, the first switch S1 is closed (conducting) and the switches S2, S3, S4, S5, S6, S7 and S8 are open (non-conducting). The load is thus isolated from the switched capacitor circuit 10.

Over a short period of time, the capacitors C1, C2, C3 and C4 become charged in series.

Once the capacitors are charged, the switch S1 opens (non-conducting mode) so that the switched capacitor circuit 10 is isolated from the input.

The switches of both sets S2, S3, S4, S5, S6 and S7 are then closed (conducting) resulting in a parallel configuration of the capacitors C1, C2, C3 and C4.

As a result, the input voltage has been divided by a factor of four, which is equal to the number of capacitors, while the charge multiplied by a factor of four which is also equal to the total parallel capacitance of C1, C2, C3 and C4.

Shortly after this, switch S8 is closed (conducting mode). The capacitors C1, C2, C3 and C4 discharge to the output capacitor defined by the load 12, which functions as the output capacitor of the switched capacitor converter. There may be an output capacitor as part of the switched capacitor converter, or it may only be part of the driven load. Of course it is possible to obtain a higher ratio of conversion by increasing the number of capacitors and switches.

Figure 2:
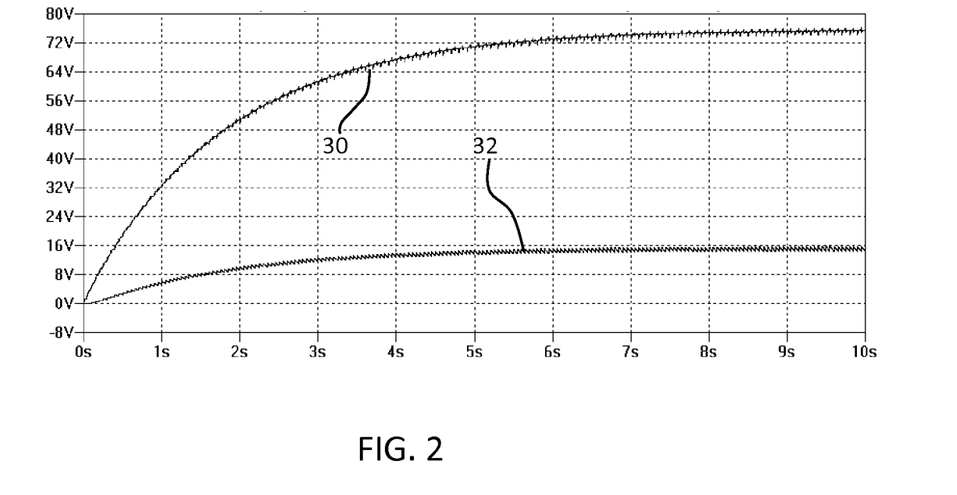
FIG. 2 shows the input and output of the switched capacitor power converter of FIG. 1.

FIG. 2 show simulation results for the power conversion circuit of FIG. 1. Plot 30 shows the output voltage from the triboelectric generator 14 and plot 32 shows the output voltage provided to the load.

The general switched capacitor converter topology is well-known. Other specific circuit implementations are also well known.

This invention relates to the generation of the control signals in order to control the switches as a function of the voltage generated by the TEG.

The switches are to be switched from series to parallel mode when the capacitors have fully charged. This is a function of the current delivered by the power generator. Thus, a signal from the power generator which is indicative of the current used may form the basis of the control for the switches. However, rather than relying on detailed signal analysis, a signal which is derived directly from movement associated with the power generator may be used, such as a frequency of rotation or a period of a pulsed mechanical movement.

Figure 3:
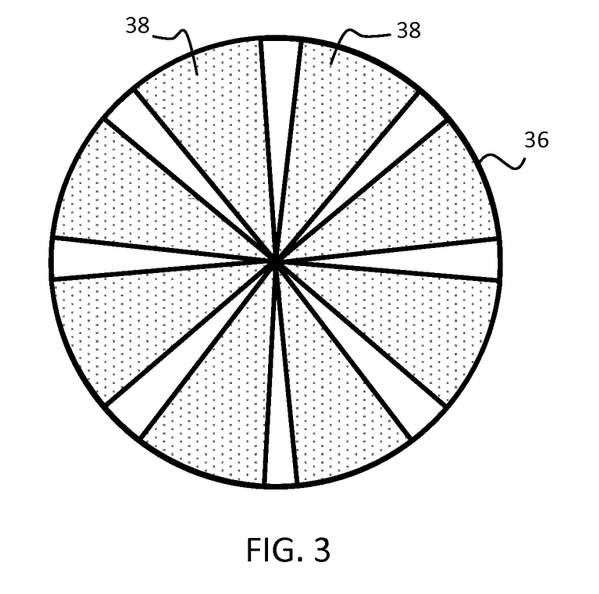
FIG. 3 shows a known rotor or stator design for a triboelectric power generator.

A first example will be described for a rotating disc TEG. The TEG has a rotor and a stator which have facing surfaces. FIG. 3 shows a pattern for the rotor and/or stator disc elements, in the form of surface portions which form circumferentially separated sector regions 38 of the disc element 36. The particular pattern shown is for illustration only and it should be understood that the spacing, arrangement, or configuration of the sector regions 38 may differ.

As the rotor rotates, the relative rotation of surface portions 38 of the rotor and corresponding portions of the stator generate an output current.

As discussed previously, a rotating disc TEG is a particular subset of linear sliding mode TEGs in which power is generated through the successive overlap and then separation of spaced circle sectors of triboelectrically active material formed on opposing surfaces of mutually rotating disc elements. As described above, a charge may be induced between two laterally sliding—oppositely charged—layers, with a magnitude in proportion to the rate of change of the area of overlap. As each consecutively spaced sector of the rotor comes into and then out of overlap with a given stator sector, so (in the presence of a load) a current is induced between the two sector plates, initially in a first direction, as the plates increase in overlap, and then in the opposite direction as the plates decrease in overlap. The result is an alternating current having a peak amplitude which is related, inter alia, to the surface area and material composition of the triboelectric surface portions, and having a frequency which is related, inter alia, to the relative speed of rotation between the discs and to the relative spacing or pitch of the pattern of triboelectric surface portions.

Figure 4:
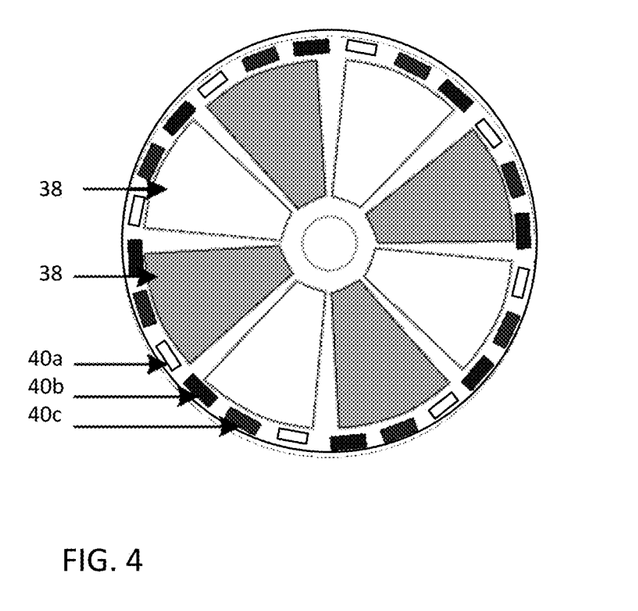
FIG. 4 shows a first example of rotor or stator design for a triboelectric power generator.

A first example of the system of the invention makes use of a modified pattern for the rotor and/or stator as shown in FIG. 4.

The same pattern of generator regions 38 is shown, with additional control electrodes 40a, 40b, 40c around the outer periphery of the generator regions 38. The control electrodes are designed so that the switching pattern for the switched capacitor converter 10 is synchronized with the output voltage of the TEG. This means there is automatic generation of a synchronized control signal, based on optimal positioning of the control electrodes with respect to the power generation electrodes. In this way, the power conversion can be optimized without the need of a special detection and control circuit.

There are different control electrodes, with three sets in the example shown, so that different switches may be controlled independently. For example, the arrangement of FIG. 4 enables three different switch control signals to be generated. They may have different timing but the same frequency, or they may even have different frequencies, for example by having different numbers of electrodes in one set compared to another, or by having different sizes of control electrodes.

In one set of examples, the switches S1 to S8 that are used in the switched capacitor converter are electrically controlled in response to a level of charge, so that charge controlled devices may be used.

When a suitable threshold charge in built up, switching takes place. For example, a transistor can be connected to switch when a sufficient charge is built up on the gate. For example, the charge generated by the control electrodes may be used directly to control MOSFET transistor switches. The charge is built up at a rate dependent on the rate of rotation. The switches are typically transistors, although other charge controlled switches may be used, such as MEMS switches.

The charge supplied to the switching devices may be generated by various different approaches.

The example of FIG. 4 is based on additional rotor and/or stator patterns on the TEG. These function as miniature generators, generating only enough charge to control the switches in an automated way. However, other approaches are possible for generating the desired control signal.

A first alternative approach is to use a charge coupled device, such as a photodiode 37. This may be used to generate an optical output. The switches S1 to S8 are then sensitive to light, for example implemented as phototransistors. In this case, the rotor and/or stator may use additional control electrodes 40a, 40b, 40c as light blocking segments 40b and light passing segments 35 (part of 40c) in order to provide pulsed light to the phototransistors, so that charge is again built up on the phototransistors in dependence on the physical rotation of the TEG. Alternatively the photodiodes may generate a pulsed light output directly in response to the TEG rotation.

A second alternative approach is to make use of the mechanical motion of one part of the TEG for example in the case of a tapping mode device. In this case, a mechanical charge coupled device such as a piezoelectric device or pyro electric device is used to generate charge in response to the periodic motion. Again, the rate of charge generation is a function of the rate of change of the mechanical input driving the power generator. For example, a piezoelectric material could be implemented on one side of a tapping mode TEG. Each time contact is made between the two parts of the TEG, the piezoelectric material will generate an electrical signal. This signal can be used as a control signal.

A third alternative approach is to use a magnetically coupled arrangement such as a permanent magnet and a magnetic detection device such as a coil or a magneto-resistance sensor. If a small permanent magnet is for example placed on the rotor and a corresponding magnetic detection device is placed on the stator, this sensing device will generate a control signal each time the magnet passes above it.

Figure 5:
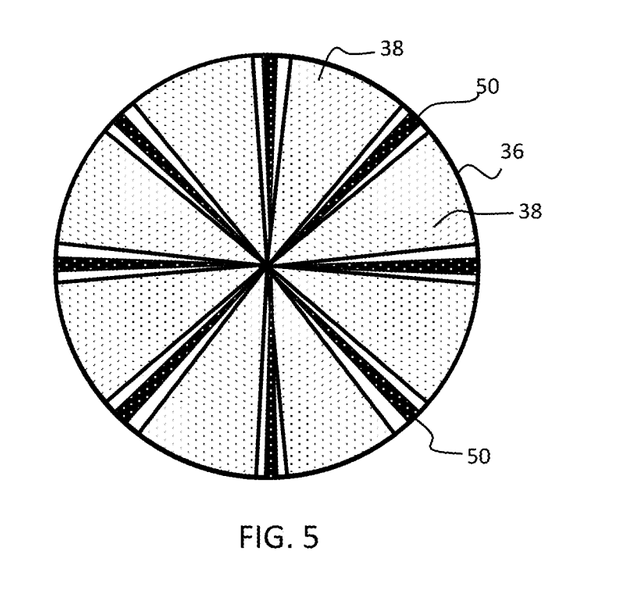
FIG. 5 shows a second example of rotor or stator design for a triboelectric power generator.

FIG. 5 shows an alternative configuration (for the rotor for example) where a control electrode 50 is placed in between each pair of power electrodes 38. The control electrodes may be connected to each other, thus forming one electrode. As the rotor rotates on relative to the stator, a control signal is provided to the switched capacitor converter just before a stator segment is about to pass over a power electrode.

Thus, the converter is again synchronized with the output signal of the TEG. The number and position of the control electrodes 50 can be selected accordingly. Whilst the examples of FIGS. 4 and 5 are relate to a rotary TEG device, equivalent self-timing and synchronization approaches can be favorably applied to sliding mode TEGs.

The self-synchronization approach described above is not limited only to the synchronization of the power conversion stage. It may also be used for controlling other aspects, such as feedback for controlling the power output of TEG.

Figure 6:
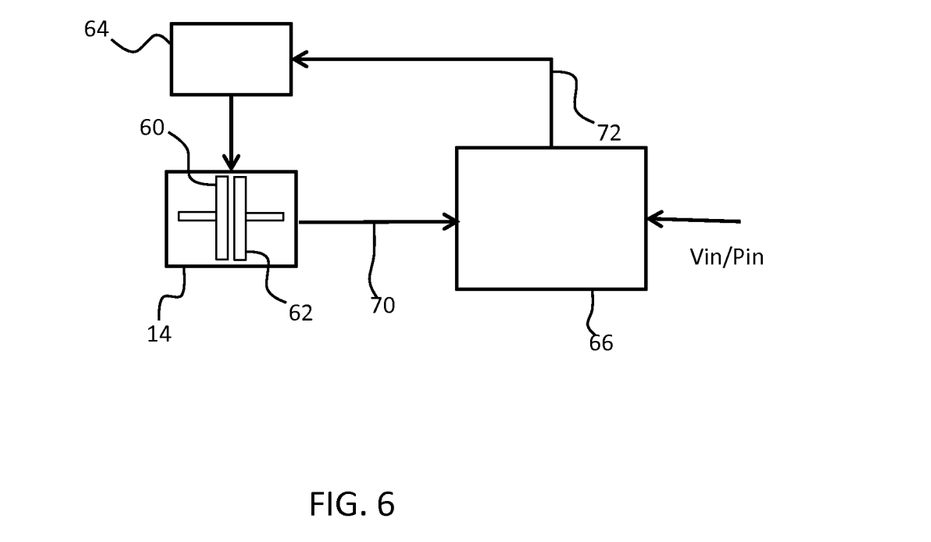
FIG. 6 shows a rotating disc triboelectric power generator with a power control circuit.

FIG. 6 shows block diagram of one example arrangement for this system.

The triboelectric generator 14 is again shown in the form of a rotating disc TEG, but it will be understood by those skilled in the art that the arrangement may equally be applied to other varieties of triboelectric generator (as discussed in previous sections).

The generator has generator elements in the form of a rotor 60 and a stator 62. The rotor 60 of the TEG 14 is operatively coupled with a mechanical output of a mechanical drive arrangement 64, for example a motor. The mechanical drive arrangement 64 provides the input source of kinetic or motor energy, which is to be converted by the system into electrical energy. The drive arrangement is controlled by a controller 66.

The mechanical drive arrangement 64 may in some embodiments comprise an external source, such as for example a wind or water driven turbine, a vibrational energy source, or human-driven source of motor events. In this case, the system may function as an energy 'harvesting' system, wherein externally generated energy otherwise lost is captured and converted into an electrical energy source.

According to alternative embodiments, as shown in FIG. 6, the mechanical drive arrangement 64 comprises a source internal to the system itself, such as for example a motor unit. In this case, the system may simply provide energy conversion functionality.

A control signal 70 is provided as a feedback signal, and it is the feedback signal as described above.

The controller 66 generates an output signal 72 (Vin/Pin) for controlling the motor 64, taking into account a desired voltage or power as input to the controller 66. The output power and/or voltage of the rotating disc TEG can then be maintained to be constant by, for example, controlling the rotational speed of the rotor based on the output signal 72. Since the output signal of the TEG control electrode has a frequency which is proportional to the rotational speed of the rotor, this information can also be used as a feedback signal to the controller 66 controlling the rotational speed of the rotor, and thus the output power of the TEG. In particular, it is representative of the voltage and power delivered by the TEG.

Figure 7:
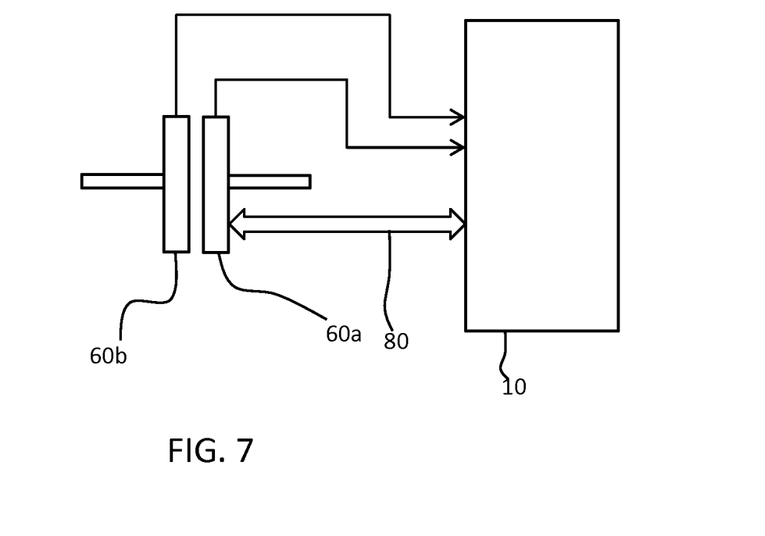
FIG. 7 shows a stepping mode triboelectric power generator with automatic timing a switched capacitor power converter.

A tapping mode TEG is considered in FIG. 7. In this case, a movable first part 60a of the TEG typically moves back and forth with respect to a stationary second part 60b of the TEG. The mechanical movement of the TEG may be then used as a driving signal for a power converter using the teaching above.

In this situation, the MOSFET switches that are typically implemented in the switched capacitor converters may be replaced by MEMS switches. The gate of the MEMS switch may be brought into mechanical connection with the first part 60a as shown by coupling 80. The power converter is then automatically synchronized with the signal generated by the TEG.

Various examples of triboelectric generator have been discussed above. Such generators have a contact mode and a non-contact mode. The invention may be applied to other types of power generator.

Some general examples of triboelectric-based generator arrangements include rotating-disc triboelectric generators, which are a subset of linear sliding mode TEGs. Another type is a device which operates with a vertical contact-separation mode, in which two or more plates are cyclically brought into or out of contact by an applied force.

Other types of power generator include induction generators or asynchronous generators. These are known alternating current (AC) electrical generators that use the principles of electromagnetic induction motors to produce power. Induction generators operate by mechanically turning their rotors faster than the synchronous speed. Induction generators are well known in applications where energy can be recovered with relatively simple controls.

Induction generators are often used in wind turbines and some micro hydro installations due to their ability to produce useful power at varying rotor speeds. Electromagnetic induction generators are however not generally suitable for very small power and low cost applications, and an alternative is electrostatic induction. This enables a simple structure and gives a high output voltage at relatively slow speeds. A promising area is the use of electrostatic induction with an electret, which is a dielectric material with a semi-permanent charge.

An electret based generator creates a flow of charge based on the position of the electret relative to associated work electrodes. The electret induces a counter charge on the work electrodes, and changes in the position of the electret with respect to work electrodes generates a movement of charge and hence an output current.

The invention may be applied to these various power generation technologies, whenever a switched capacitor power converter is of interest.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A system comprising:
    a power generator arranged to generate for generating electrical power in response to mechanical actuation;
    a switched capacitor power converter arranged to power convert the output of the power generator, wherein the switched capacitor converter comprises a bank of capacitors and a switch arrangement; and
    a controller circuit arrange arranged to control the switch arrangement, wherein the controller is arranged to change a configuration of the bank of capacitors from a series configuration into a parallel configuration based on a feedback signal from the power generator,
    wherein the power generator comprises a rotating disc triboelectric power generator,
    wherein the rotating disc triboelectric power generator comprises a rotor and a stator,
    wherein a rotor and/or stator pattern is arranged to provide the feedback signal.

2. The system as claimed in claim 1, wherein the power generator comprises a triboelectric power generator.

3. The system as claimed in claim 1, wherein the power generator generates the feedback signal in response to motion.

4. The system as claimed in claim 1, wherein the power generator comprises a charge coupled device, the charge coupled device arranged to generate the feedback signal.

5. The system as claimed in claim 1,
    wherein the power generator comprises a signal generator circuit,
    wherein the signal generator circuit is arranged to generate the feedback signal in response to a mechanical motion of a portion of the power generator.

6. The system as claimed in claim 5, wherein the power generator comprises a mechanical charge coupled device.

7. The system as claimed in claim 5, wherein the power generator comprises a piezoelectric device.

8. The system as claimed in claim 1,
    wherein the power generator comprises a signal generator,
    wherein the signal generator is arranged generate the feedback signal in response to magnetic coupling detected by a sensor.

9. The system as claimed in claim 1,
    wherein the rotor or the stator comprises a ring of generation electrodes,
    wherein the rotor or the stator comprises a set of charge generating control electrodes,
    wherein each of the generation electrodes comprise a radial segment,
    wherein the different segments are isolated from each other,
    wherein the set of charge generating control electrodes are arranged to generate the feedback signal.

10. The system as claimed in claim 9, wherein the charge generating control electrodes are positioned around the periphery of the generation electrodes.

11. The system as claimed in claim 9, wherein the charge generating control electrodes are positioned between adjacent radial segments.

12. The system as claimed in claim 1, wherein the power generator comprises a photodiode, the photodiode arranged to generate the feedback signal.

13. A method of energy conversion comprising:
    generating electrical power using a power generator in response to mechanical actuation;
    implementing power conversion of the output of the power generator using a switched capacitor power converter, the switched capacitor converter comprising a bank of capacitors and a switch arrangement;
    controlling the switch arrangement, wherein the controlling changes a configuration of the bank of capacitors from a series configuration into a parallel configuration based on a feedback signal from the power generator; and
    generating the feedback signal using a charge coupled device,
    wherein the generating of the feedback signal uses a rotor and/or stator pattern of a rotating disc triboelectric power generator,
    wherein the rotor or stator comprises a ring of generation electrodes,
    wherein the rotor or the stator comprises a set of charge generating control electrodes,
    wherein each of the generation electrodes comprise a radial segment,
    wherein the different segments are isolated from each other,
    wherein the set of charge generating control electrodes are arranged to generate for generating the feedback signal.

14. The method as claimed in claim 13, comprising generating the feedback signal in response to motion.

15. The method as claimed in claim 13, comprising generating the feedback signal using a component selected from the group consisting of a photodiode, a signal generator which generates a signal in response to a mechanical motion of a part of the power generator, sensor for sensing a magnetic coupling, and a rotor and/stator pattern of a rotating disc triboelectric power generator.

* * * * *